UNITED STATES PATENT OFFICE.

WILHELM HERZBERG AND WALTER BRUCK, OF SCHÖNEBERG, NEAR BERLIN, GERMANY, ASSIGNORS TO ACTIEN GESELLSCHAFT FÜR ANILIN FABRIKATION, OF BERLIN, GERMANY.

SULFURIZED VAT DYE OF THE ANTHRAQUINONE SERIES.

996,485.  Specification of Letters Patent.  Patented June 27, 1911.

No Drawing.  Application filed April 12, 1911.  Serial No. 620,671.

*To all whom it may concern:*

Be it known that we, WILHELM HERZBERG and WALTER BRUCK, subjects of the Emperor of Germany, residing at Schöneberg, near Berlin, Germany, our post-office addresses being Landshuterstrasse 24 and Neue Culmstrasse 5ª, respectively, Schöneberg, near Berlin, Germany, have invented certain new and useful Improvements in New Sulfurized Vat Dyes of the Anthraquinone Series, of which the following is a specification.

In our application filed January 30th, 1911, and serially numbered 605,610 we describe and claim among others sulfurized vat dyes of the anthraquinone series deriving from a monobenzyl or monobenzylidene compound of 2.6- or 2.7-diamino-anthraquinone, which dyes possess most probably a so-called thiazole nucleus and on the other side a free amino group. Now, according to our present invention, these thiazole dyes are to be converted into new dyes by substituting in this amino group for a hydrogen atom an acidyl group that is to say the residue of an organic acid, such as for instance formyl, acetyl, benzoyl, phthalyl, malonyl, oxalyl, succinyl, etc. These new dyes are distinguished by a great intensity and good properties; they produce on cotton from a suitable vat, generally speaking, clear and intense yellow tints.

In order to illustrate our invention the following examples may be given, the parts being by weight:

Example 1: 35 parts of the thiazole compound which is obtained by acting with sulfur upon the monobenzylidene compound of 2.6-diamino-anthraquinine, and about 50 parts of acetic anhydrid are boiled together in a reflux apparatus. The orange-yellow amino derivative disappears very quickly during the heating and the new acetylated dye separates as a crystalline yellow precipitate which is drained, washed with water and dried. The new vat dye thus obtained forms in the dry state when pulverized a yellow powder which is insoluble in alcohol, benzene and glacial acetic acid and slightly soluble in nitrobenzene, anilin, pyridin and dichlorobenzene to a yellow solution. It dissolves in concentrated sulfuric acid to a yellow solution from which on the addition of ice yellow flakes are separated; in fuming sulfuric acid (25% of $SO_3$) a brown-red solution is obtained. This new dye gives with hydrosulfite and an alkali a blue-red vat from which cotton is dyed a dark violet which by aging turns to a clear and intense yellow, which is fast to washing, to chlorin and to the action of light. If this solution of the dye in concentrated sulfuric acid is warmed on the water bath the acetyl group is split off, the corresponding amino thiazole with the free amino group resulting which amino-thiazole when dyed on cotton from a suitable vat gives an orange yellow shade which can be diazotized and developed with beta-naphthol yielding thus a red brown tint.

Example 2: 35 parts of the sulfurized anthraquinone thiazole compound derived from monobenzylidene-2.6-diaminoanthraquinone (compare Example 1), 350 parts of nitrobenzene and 15 parts of benzoyl-chlorid are heated together to boiling. The benzoyl derivative separates as a yellow substance which is drained, washed with water and dried. The benzoylated new vat dye thus obtained yields a blue violet vat in which cotton is dyed blackish blue, passing to a brilliant clear yellow by exposure to air. This new dye shows essentially the same physical and chemical behavior as the new dye described in Example 1.

It is obvious to those skilled in the art that our present invention is not limited to the foregoing examples or to the details given therein. Thus for instance instead of the 6-amino-anthraquinonyl-1.2-phenyl thiazole the corresponding 7-amino compound may be employed as well as a mixture of the 6-amino and 7-amino compounds. Furthermore another acidyl group, such as formyl, oxalyl, malonyl, succinyl may be introduced in the free amino group of the respective anthraquinonyl-1.2-phenyl-thiazole. In producing such another acidyl derivative of course any other suitable method may be used. It is also convenient to state that any suitable indifferent solvent may be employed in carrying out the process of our invention.

Having now described our invention and the manner in which it may be performed, what we claim is,—

1. As new articles of manufacture new sulfurized vat dyes of the anthraquinone series derived from an anthraquinone-thiazole and possessing an acidyl-amino group NH.R, R signifying the residue of an organic acid, these new dyes producing on cotton from a vat clear and intense yellow tints of a good fastness, and which new dyes in the dry shape when pulverized are yellow powders, practically insoluble in alcohol, benzene and glacial acetic acid, but soluble in anilin, pyridin and nitrobenzene to a yellow solution, whereas they dissolve in concentrated sulfuric acid to a yellow solution and in fuming sulfuric acid of 25% $SO_3$ to a brown to red solution, and these new dyes if acted upon with a saponifying agent being transformed into anthraquinone-thiazole compounds having a free amino group, and this aminoanthraquinone-thiazole when dyed on cotton being capable of being diazotized and developed with beta-naphthol.

2. As a new article of manufacture the new 6-acetyl-amino-anthraquinonyl-1.2-phenyl-thiazole of the formula:

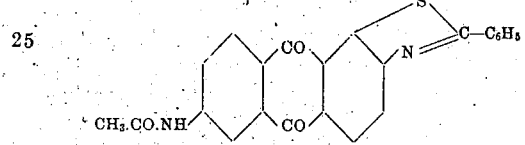

which dyes cotton from a vat a clear and intense yellow fast to washing, to chlorin and to the action of light, which new dye in the dry shape when powdered is a yellow powder practically insoluble in alcohol, benzene and glacial acetic acid, but soluble in anilin, pyridin and nitrobenzene to a yellow solution, and this new dye dissolving in concentrated sulfuric acid to a yellow solution from which solution on the addition of ice yellow flakes are separated, and which new dye in fuming sulfuric acid of 25% $SO_3$ dissolves to a brown red solution, this new dye if dissolved in concentrated sulfuric acid and this solution warmed on the water bath, being deprived of the acetyl group, the corresponding amino-thiazole with a free amino group resulting, which amino-thiazole when dyed on cotton from a vat gives an orange-yellow shade which can be diazotized and developed with beta-naphthol yielding thus a red-brown tint.

In testimony whereof we have hereunto set our hands in presence of two subscribing witnesses.

WILHELM HERZBERG.
WALTER BRUCK.

Witnesses:
 WOLDEMAR HAUPT,
 HENRY HASPER.